United States Patent [19]

Takeda et al.

[11] Patent Number: 5,026,120
[45] Date of Patent: Jun. 25, 1991

[54] HEADREST ASSEMBLY FOR VEHICLE SEATS

[75] Inventors: Nobuhiko Takeda, Obu; Isao Morishita; Satoshi Aida, both of Toyota, all of Japan

[73] Assignee: Aisin Seiki Kabushiki Kaisha, Japan

[21] Appl. No.: 556,389

[22] Filed: Jul. 24, 1990

[30] Foreign Application Priority Data

Jul. 27, 1989 [JP] Japan .................. 1-88161[U]

[51] Int. Cl.$^5$ ........................... A47C 7/36; A47C 7/38
[52] U.S. Cl. .................... 297/408; 297/406; 297/410; 74/89.15
[58] Field of Search ........... 297/408, 409, 410, 391; 74/89.15

[56] References Cited

U.S. PATENT DOCUMENTS

| | | | |
|---|---|---|---|
| 2,337,902 | 12/1943 | Lakin | 74/89.15 |
| 3,509,781 | 5/1970 | Marcovecchio | 74/89.15 |
| 3,593,503 | 7/1971 | Andrews | 74/89.15 |
| 4,351,563 | 9/1982 | Hattori | 297/391 |
| 4,640,549 | 2/1987 | Yokoto | 297/410 |
| 4,678,232 | 7/1987 | Ishida et al. | 297/408 |
| 4,693,128 | 9/1987 | Plow | 74/89.15 |
| 4,715,580 | 12/1987 | Mueller | 74/89.15 |
| 4,718,716 | 1/1988 | Stumpf et al. | 297/408 |
| 4,830,434 | 5/1989 | Ishida et al. | 297/410 |

FOREIGN PATENT DOCUMENTS

| | | | |
|---|---|---|---|
| 11009 | 5/1980 | France | 297/406 |
| 148727 | 8/1985 | Japan | 297/406 |
| 253012 | 11/1986 | Japan . | |

Primary Examiner—Kenneth J. Dorner
Assistant Examiner—Cassandra Hope
Attorney, Agent, or Firm—Finnegan, Henderson, Farabow, Garrett & Dunner

[57] ABSTRACT

A headrest assembly for vehicle seats includes a first stationary link and a second link connected to the first link and side walls of a bracket for padded member. A rod is rotatably connected to the first link and received in slots on the bracket. When a motor mounted on the bracket is actuated, a screw member engaged with a nut member which is fixed on the rod causes the bracket to be swiveled.

4 Claims, 7 Drawing Sheets

HEADREST ASSEMBLY FOR VEHICLE SEATS

BACKGROUND OF THE INVENTION

The present invention relates to a headrest assembly for vehicle seats capable of supporting a neck of vehicle occupant.

To obtain a comfortable attitude of vehicle occupants or passengers during vehicle operation, a neck supporting member is used with a headrest assembly secured to a seat backrest of the vehicle as shown in Japanese Utility Model Publication (Kokai) No. 253012/1986. The neck supporting member is actuated by operation of a handle located so near to the headrest assembly to support the neck of the passenger.

Due to the installation of the neck supporting member, a forward and rearward movement or swiveling movement of the headrest assembly becomes impossible and hence the comfortable attitude of the passenger can not be provided.

SUMMARY OF THE INVENTION

Accordingly, an object of the present invention is to provide a headrest assembly adjustably supporting both a head and a neck of a passenger seated on the vehicle seats by means of a single mechanism.

Another object of the present invention is to provide a headrest assembly for vehicle seats which is moved swivelingly to secure a rest position for a head and a neck of a passenger.

According to the present invention, the foregoing object is attained by providing a headrest assembly for vehicle seats having a seat backrest comprising, a bracket having opposed side walls and adjustably swivelingly arranged with respect to a stay of the seat backrest, the opposed side walls being provided with vertically extending slots, a rod of which end portions are received in the slots, respectively, a first link disposed between the opposed side walls and fixedly secured to the stay of the seat backrest, side panels of the first link which are located inside the opposed side walls being rotatably connected to the rod, a second link disposed between the opposed side wall and having connecting plates at its ends, the connecting plates being pivoted to the opposed side walls and connected to the side plates of the first link, respectively, and means for swiveling the bracket around the connecting point of the first link and the second link. The bracket swiveling means includes a nut member secured to the first link, a screw member engaged with the nut member and rotatably supported on the bracket, and a motor for driving the screw member and secured to the bracket.

Other features and advantages of the present invention will be apparent from the following description taken in conjunction with the accompanying drawings, in which like reference characters designate the same or similar parts throughout the figures thereof.

DESCRIPTION OF THE PREFERRED EMBODIMENTS

Figure 1:
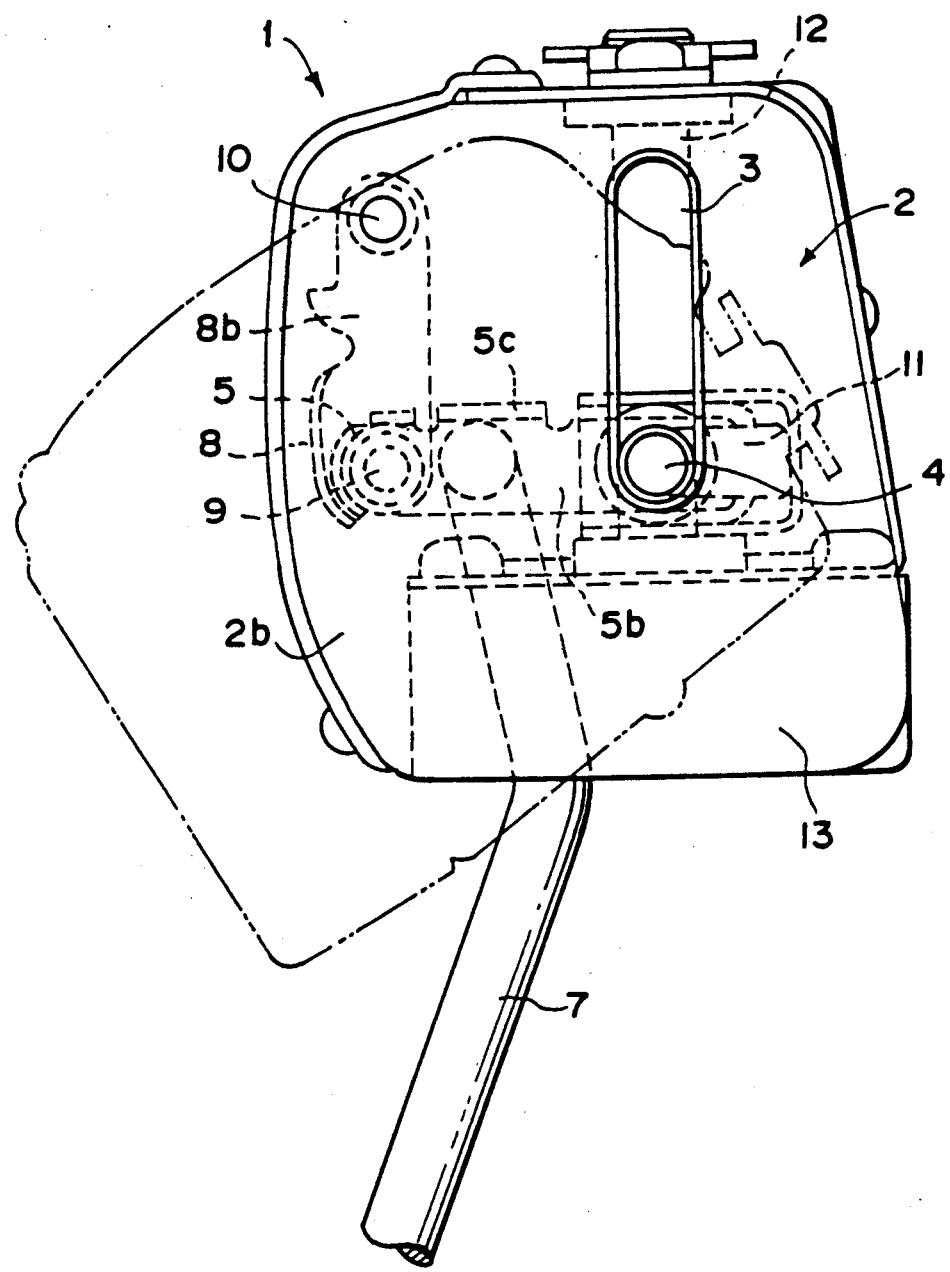
FIG. 1 is a side view of an embodiment of a headrest assembly according to the present invention.
Figure 2:
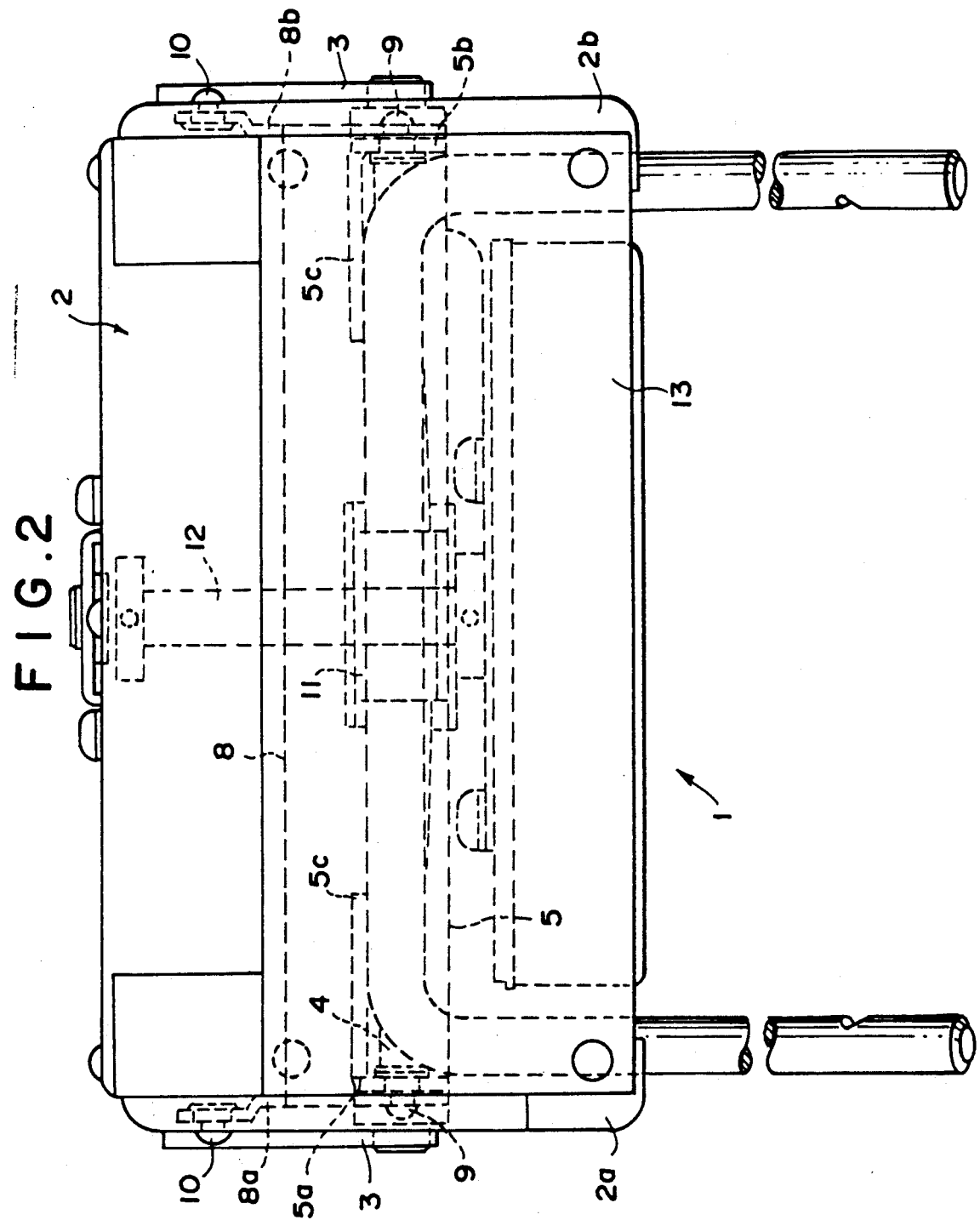
FIG. 2 is a front view of the embodiment illustrated in FIG. 1.
Figure 3:
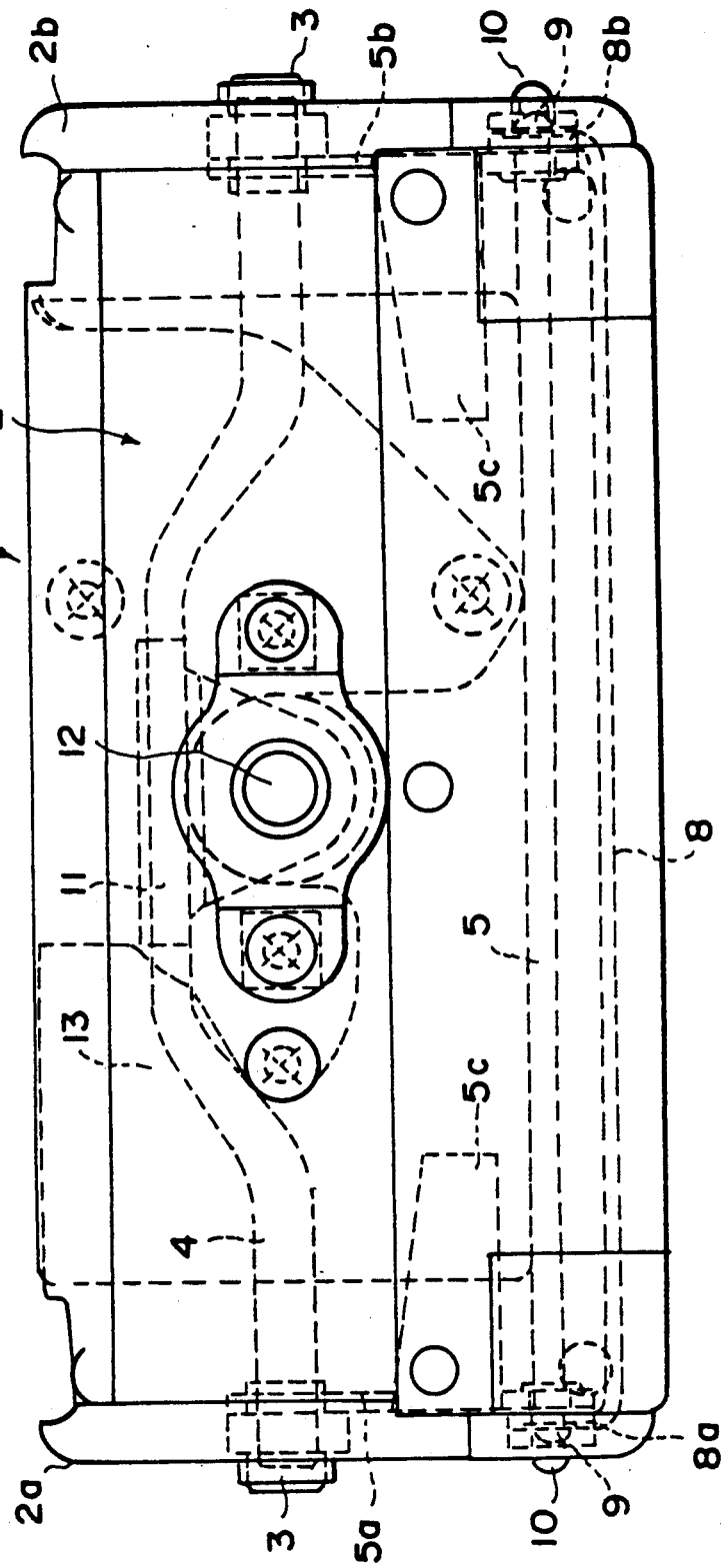
FIG. 3 is a plan view of the embodiment illustrated in FIG. 1.
Figure 4:
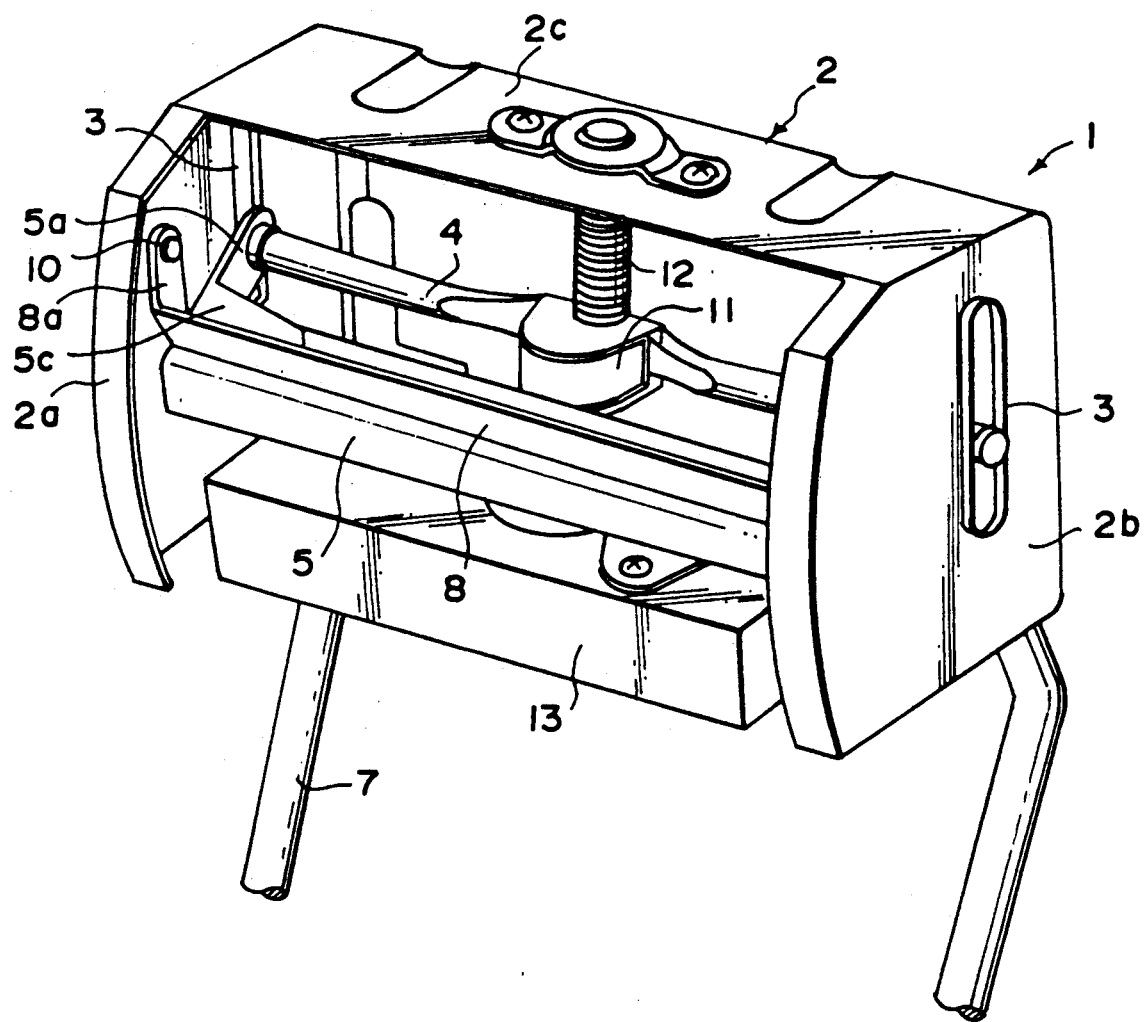
FIG. 4 is a perspective view of the embodiment illustrated in FIG. 1.

Refer to FIGS. 1-5, a headrest assembly 1 comprises a padded support and a main body having a bracket 2 of a U-shaped cross-section of which opposed side walls 2a, 2b each has a vertically extending slot 3, respectively. A laterally extending rod 4 is located between the opposed side walls 2a, 2b of the bracket 2 and end positions of the rod 4 are received in the slot 3 in such a manner that a vertical movement of the rod 4 is permitted. The rod 4 is provided at its center part with a nut member 11 which is engaged with a screw member 12. A stay 7 fixedly secured to a seat back 6 (see FIGS. 6-8) of vehicle seat having an upper U-shaped portion to which headrest 1 is held.

A first link 5 extending between the opposed side walls 2a, 2b of the bracket 2 is provided at its end portions with side panels 5a, 5b along inside the side walls 2a, 2b of the bracket 2.

Flange portions 5c of the side panels 5a, 5b are welded to the stay 7 and the rear parts of the side panels 5a, 5b are supported through bearings to the rod 4, respectively, so that the stay 7 and the first link 5 are stationary members.

A second link 8 extending between the opposed side walls 2a, 2b of the bracket 2 is provided at its end portions with connecting panels 8a, 8b along inside the opposed walls 2a, 2b of the bracket 2 of which one ends each is pivoted through a pin 9 to each of the side panels 5a, 5b and of which other ends each is pivoted through a pin 10 to each of the opposed side walls 2a, 2b of the bracket 2.

An electrical motor 13 is secured to a lower part of the bracket 2 and an output shaft of the motor 13 is connected to the screw member 12 through a suitable reduction gear to transmit a rotational torque to the screw member 12. A head portion of the screw member 12 is rotationally supported by a top wall 2c of the bracket 2 so that an actuation of the motor 13 causes the bracket 2 to be moved vertically with respect to the rod 4 and to be swiveled about the pin 9.

Figure 6:
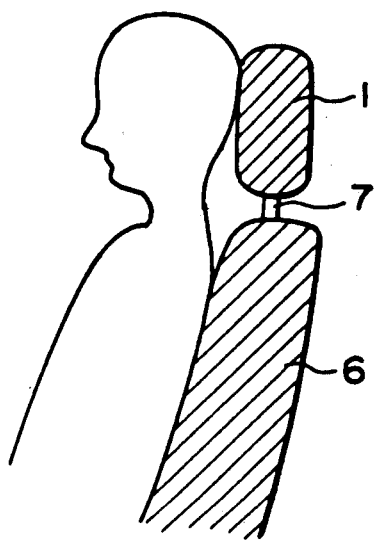
FIG. 6 is a side view of the embodiment illustrated in FIG. 1; but the headrest assembly is in a normal position.
Figure 7:
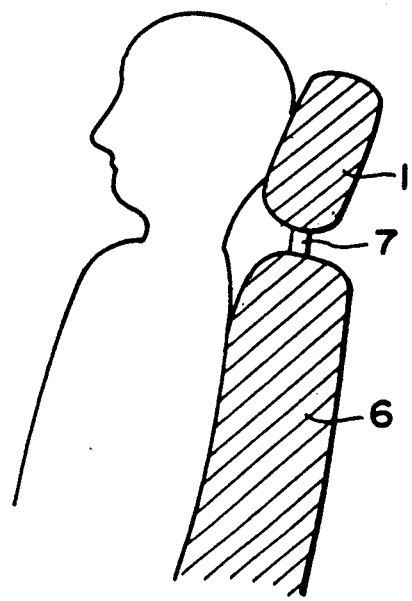
FIG. 7 is a side view of the embodiment illustrated in FIG. 1, but the headrest assembly is in a first rest positions.

The vehicle occupant will select generally a position of the headrest 1 in FIGS. 1 and 6 at the normal running stage of the vehicles. In this stage an actuation of the motor 13 will intend to move the rod 4 upwardly. However, because the rod 4 is rotatably connected to the first link 5 which is fixedly secured to the stay 7, the lift of the rod 4 is impossible and alternatively the bracket 2 including the screw member 12 and the motor 13 is to be downwardly slided along the slots 3. However, the connection of the bracket 2 with the first link 5 through the second link 8 will convert the vertical slide movement of the bracket 2 into a swiveling movement of the bracket 2 about the pin 9 in such a manner that the position of the bracket may be changed from FIG. 6 to FIG. 7 so as to offer the comfortable attitude for head of the occupant.

Figure 5:
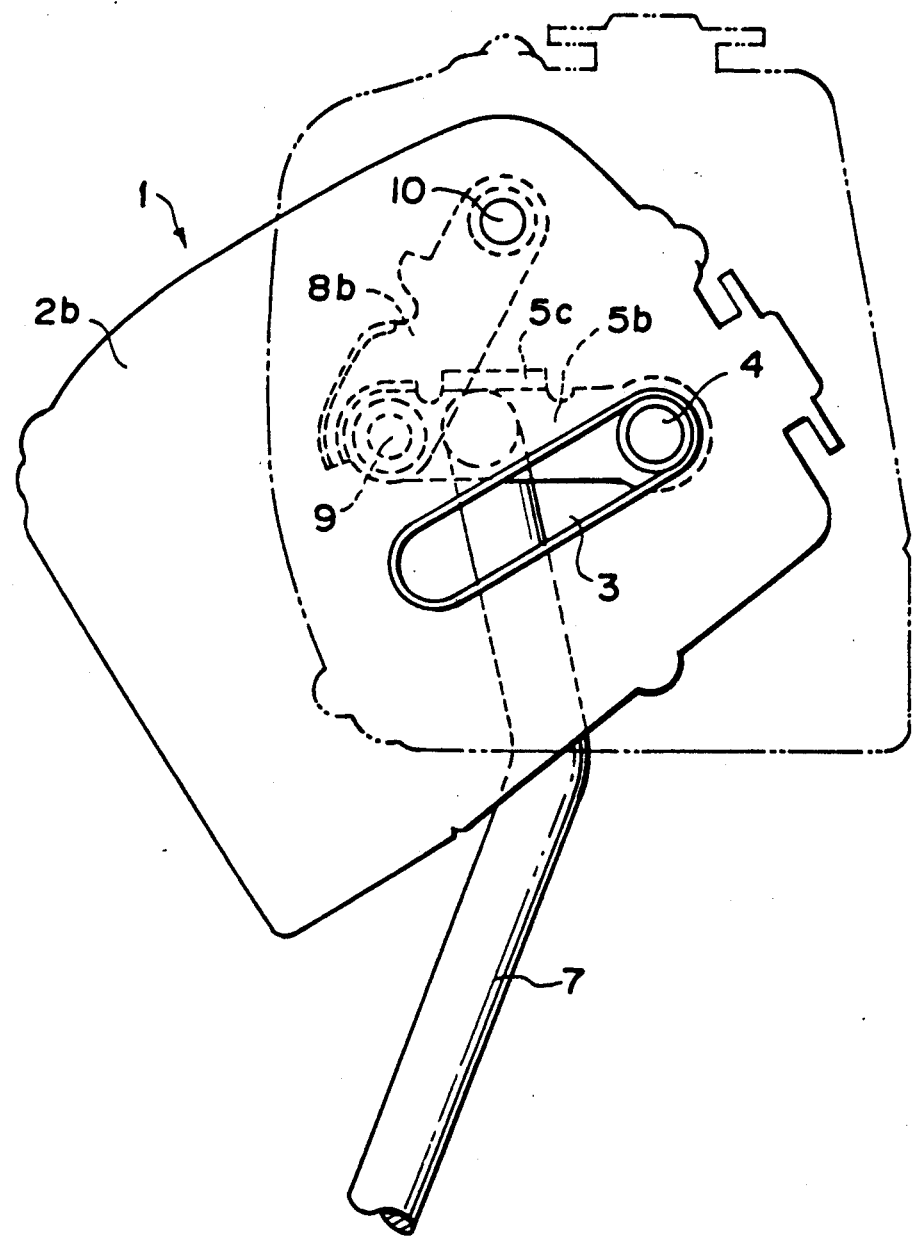
FIG. 5 is a side view of the embodiment illustrated in FIG. 1, but the rest position of the headrest assembly was taken.
Figure 8:
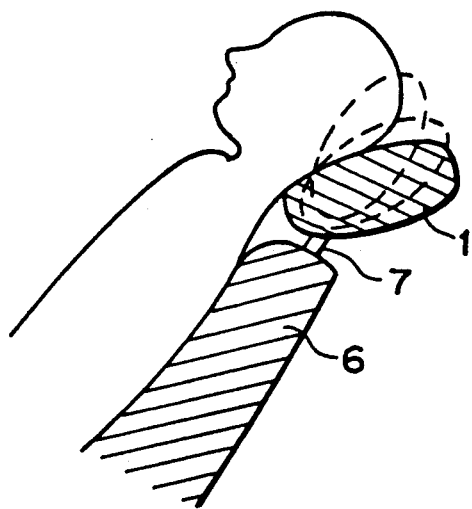
FIG. 8 is a side view of the embodiment illustrated in FIG. 1, but the headrest assembly is in a full rest position.

Further actuation of the motor 13 will promote the swiveling movement of the bracket 2 about the pin 9 to take a full rest position illustrated in FIGS. 5 and 8 wherein both a head and a neck of the passenger are adjustably supported by the headrest 1. The range of swiveling movement of the headrest will be determined according to the length of the slot 3.

In the case of the illustrated embodiment of the present invention, the adjustment of positions of the head and the neck of the occupant of the vehicle seat is successively accomplished by the single motor 13 so that separate or specific device for adjusting the position of the occupant's head and neck is not required, thereby leading to the cost-down and reduced space or scale of the headrest.

Figure 9:
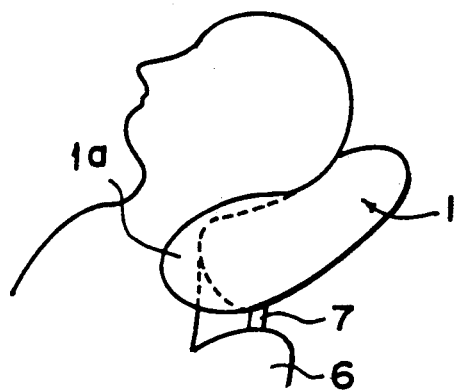
FIG. 9 is a side view illustrating another embodiment of a headrest assembly according to the present invention, but the headrest assembly is in a full rest position.
Figure 10:
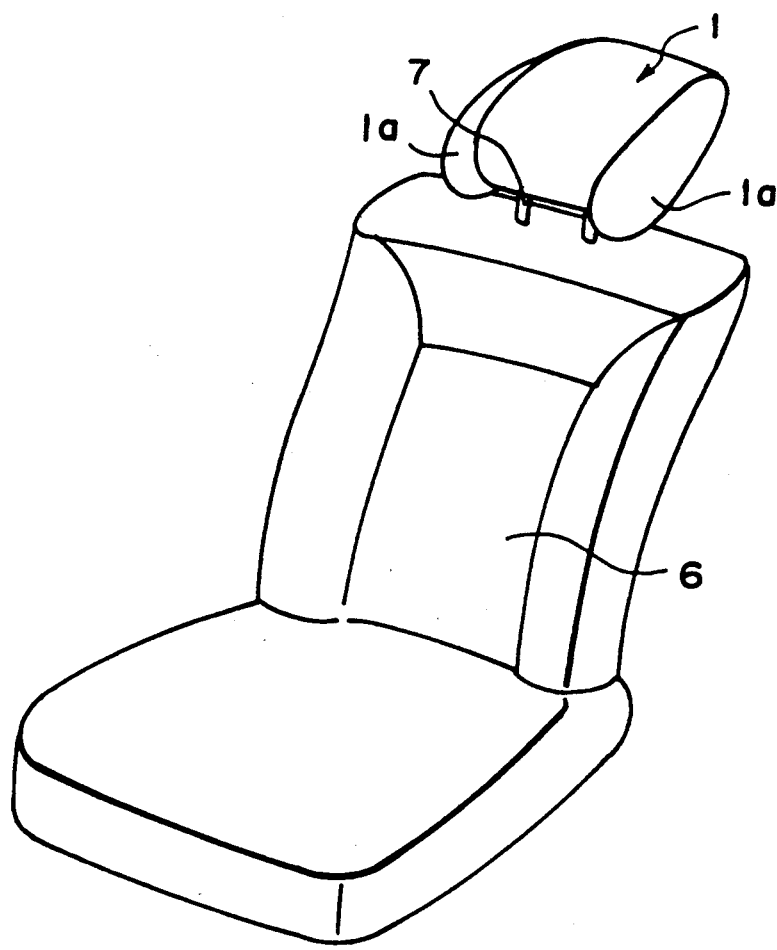
FIG. 10 is a perspective view of the embodiment illustrated in FIG. 9.

An embodiment in FIGS. 9 and 10 has support members 1a, 1a at both the sides of the headrest 1, which somewhat project forwardly not to decrease the range of vision of the vehicle occupant. In this case, sides of the head is comfortably supported as well as the back side of the head and the neck of the vehicle occupant.

The present invention is not limited to the foregoing embodiments but can be modified in various ways based on the gist thereof without departing from the scope of the claims.

What we claim is:

1. A headrest assembly for vehicle seats having a seat backrest comprising:
    a bracket having opposed side walls and adjustably swivelingly arranged with respect to a stay of the seat backrest, the opposed side walls being provided with vertically extending slots,
    a rod of which end portions are received in the slots, respectively,
    a first link disposed between the opposed side walls and fixedly secured to the stay of the seat backrest, side panels of the first link which are located inside the opposed side walls being rotatably connected to the rod,
    a second link disposed between the opposed side wall and having connecting plates at its ends, the connecting plates being pivoted to the opposed side walls and connected to the side plates of the first link, and
    means for swiveling the bracket around the connecting point of the first link and the second link.

2. The headrest assembly according to claim 1, wherein the bracket swiveling means includes a nut member secured to the first link, a screw member engaged with the nut member and rotatably supported on the bracket, and a motor for driving the screw member and secured to the bracket.

3. The headrest assembly according to claim 2, wherein the headrest can be swiveled to a position for supporting a neck of vehicle occupant.

4. The headrest assembly according to claim 3, further comprising a padded support in which the bracket is located, the padded support having support members at its sides for supporting the neck of vehicle occupant.

* * * * *